United States Patent
Zhang et al.

(10) Patent No.: US 10,547,618 B2
(45) Date of Patent: Jan. 28, 2020

(54) METHOD AND APPARATUS FOR SETTING ACCESS PRIVILEGE, SERVER AND STORAGE MEDIUM

(71) Applicant: BEIJING BAIDU NETCOM SCIENCE AND TECHNOLOGY CO., LTD., Beijing (CN)

(72) Inventors: Miao Zhang, Beijing (CN); Xin Li, Beijing (CN); Guang Yao, Beijing (CN); Jiyang Zhang, Beijing (CN); Heyi Tang, Beijing (CN); Gongwei Wu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 107 days.

(21) Appl. No.: 15/724,779

(22) Filed: Oct. 4, 2017

(65) Prior Publication Data
US 2018/0248879 A1 Aug. 30, 2018

(30) Foreign Application Priority Data
Feb. 28, 2017 (CN) .......................... 2017 1 0115491

(51) Int. Cl.
*H04L 29/06* (2006.01)
*H04L 29/12* (2006.01)
*H04L 12/66* (2006.01)
*G06N 20/00* (2019.01)

(52) U.S. Cl.
CPC .......... *H04L 63/10* (2013.01); *H04L 61/2007* (2013.01); *H04L 63/101* (2013.01); *H04L 63/1425* (2013.01); *G06N 20/00* (2019.01); *H04L 12/66* (2013.01); *H04L 63/1441* (2013.01)

(58) Field of Classification Search
CPC . H04L 63/10; H04L 63/0236; H04L 63/1458; H04L 63/101; H04L 61/2007; H04L 12/66; H04L 63/1425; H04L 63/1441; G06N 20/00; G06F 21/121
See application file for complete search history.

(56) References Cited

U.S. PATENT DOCUMENTS 9,154,479 B1 * 10/2015 Sethi ........................ H04L 63/08
2006/0288415 A1 * 12/2006 Wong .................. H04L 63/1425
726/24

(Continued)

*Primary Examiner* — Cheng-Feng Huang
(74) *Attorney, Agent, or Firm* — Lathrop Gage LLP

(57) ABSTRACT

Disclosed are a method and an apparatus for setting an access privilege. The method includes: acquiring Internet Protocol (IP) addresses having a access frequency to a target application greater than or equal to a frequency threshold, selecting IP addresses accessing more than one applications per time unit from the IP addresses as to-be-processed IP addresses to generate a to-be-processed IP address set; acquiring access information, related to an access of a target application, of the to-be-processed IP address; acquiring a plurality of target IP addresses in the to-be-processed IP address set based on the access information, determining a probability of access through a gateway by a terminal pointed by each target IP address; and selecting a preset proportion or a preset number of target IP addresses from the plurality of target IP addresses in a descending order of the probability to set the access privilege.

7 Claims, 5 Drawing Sheets

(56) References Cited

U.S. PATENT DOCUMENTS

| | | | | |
|---|---|---|---|---|
| 2015/0026780 A1* | 1/2015 | Igarashi | ............... | H04L 63/10 |
| | | | | 726/5 |
| 2015/0040198 A1* | 2/2015 | Gopalakrishnan | .... | H04L 63/102 |
| | | | | 726/5 |
| 2015/0043585 A1* | 2/2015 | Iihoshi | ............... | H04L 63/0236 |
| | | | | 370/392 |
| 2015/0244819 A1* | 8/2015 | Duleba | ............... | H04L 61/25 |
| | | | | 709/203 |
| 2017/0171188 A1* | 6/2017 | Saito | ............... | H04L 63/083 |
| 2018/0077181 A1* | 3/2018 | Chen | ............... | H04L 63/1425 |

* cited by examiner

METHOD AND APPARATUS FOR SETTING ACCESS PRIVILEGE, SERVER AND STORAGE MEDIUM

CROSS-REFERENCE TO RELATED APPLICATION

This application is related to and claims the priority from Chinese Application No. 201710115491.8, filed on Feb. 28, 2017, entitled "Method and Apparatus for Setting Access Privilege, Server and Storage Medium," the entire disclosure of which is incorporated herein by reference.

TECHNICAL FIELD

The present application relates to the technical field of computers, particularly to the technical field of Internet, and more particularly to a method and an apparatus for setting an access privilege, a server and a storage medium.

BACKGROUND

As the number of Internet users grows, security problems on the Internet have gained increasing attention. Products made by Internet companies are vulnerable to malicious capture attack. This malicious capture also increases noise flow considerably, causing excessive stress on a server.

In related technologies, a policy of access denial is implemented on user addresses which perform overly frequent accesses. However, each denied user address possibly corresponds to a large number of users. Therefore, there is a great possibility that adoption of the policy may impact the access by a large number of regular users.

SUMMARY

It is an object of the present application to provide a method and an apparatus for setting an access privilege, a server and a storage medium to solve the technical problem involved by the above background.

In a first aspect, the present application provides a method for setting an access privilege, comprising: acquiring Internet Protocol (IP) addresses having a frequency of access to a target application greater than or equal to a frequency threshold, and selecting IP addresses accessing a plurality of applications per time unit from the IP addresses as to-be-processed IP addresses to generate a to-be-processed IP address set; for each to-be-processed IP address in the to-be-processed IP address set, acquiring access information, related to an access of a target application, of the to-be-processed IP address; acquiring a plurality of target IP addresses in the to-be-processed IP address set based on the access information, and determining a probability of access through a gateway by a terminal pointed by each target IP address; and selecting a preset proportion or a preset number of target IP addresses from the plurality of target IP addresses in a descending order of the probability to set the access privilege.

In some embodiments, the for each to-be-processed IP address in the to-be-processed IP address set, acquiring access information, related to an access of a target application, of the to-be-processed IP address comprises: collecting sample information of the to-be-processed IP address, the sample information comprising a specified access time period when the terminal pointed by the to-be-processed IP address accesses each of the plurality of applications, and a number of accesses corresponding to the specified time period; and generating access information using the sample information.

In some embodiments, the access information is a vector comprising at least one of the following components: the specified access time period when the terminal pointed by the to-be-processed IP address accesses each of the plurality of applications, the number of accesses corresponding to the specified time period, a number of applications accessed by the terminal pointed by the to-be-processed IP address per time unit, a frequency ratio of access to a most frequently accessed application by the terminal pointed by the to-be-processed IP address, and an entropy of the frequency ratio of access to the target application by the terminal pointed by the to-be-processed IP address.

In some embodiments, the acquiring a plurality of target IP addresses in the to-be-processed IP address set based on the access information, and determining a probability of access through a gateway by a terminal pointed by each target IP address comprises: dividing the to-be-processed IP addresses in the to-be-processed IP address set into two classes by using a clustering algorithm, wherein mean vectors of the access information in the two classes are different; determining a class having a larger mean vector in the two classes as a target class, and determining an IP address in the target class as a target IP address; and determining a distance differential between the access information of the target IP address and the clustering centers of the two classes, the distance differential serving as a probability of access through the gateway by the terminal pointed by the target IP address.

In some embodiments, the selecting a preset proportion or a preset number of target IP addresses from the plurality of target IP addresses in a descending order of the probability to set the access privilege comprises: granting the access privilege to the application to the selected target IP address.

In a second aspect, the present application provides an apparatus for setting an access privilege, comprising: a selection unit configured to acquire Internet Protocol (IP) addresses having a frequency of access to a target application greater than or equal to a frequency threshold, and select IP addresses accessing a plurality of applications per time unit from the IP addresses as to-be-processed IP addresses to generate a to-be-processed IP address set; an acquisition unit configured to, for each to-be-processed IP address in the to-be-processed IP address set, acquire access information, related to an access of a target application, of the to-be-processed IP address; a determination unit configured to acquire a plurality of target IP addresses in the to-be-processed IP address set based on the access information, and determine a probability of access through a gateway by a terminal pointed by each target IP address; and a setting unit configured to select a preset proportion or a preset number of target IP addresses from the plurality of target IP addresses in a descending order of the probability to set the access privilege.

In some embodiments, the acquisition unit comprises: a collection module configured to collect sample information of the to-be-processed IP address, the sample information comprising a specified access time period when the terminal pointed by the to-be-processed IP address accesses each of the plurality of applications, and a number of accesses corresponding to the specified time period; and a generation module configured to generate access information using the sample information.

In some embodiments, the access information is a vector comprising at least one of the following components: the specified access time period when the terminal pointed by the to-be-processed IP address accesses each of the plurality of applications, the number of accesses corresponding to the specified time period, the number of applications accessed by the terminal pointed by the to-be-processed IP address per time unit, a frequency ratio of access to a most frequently accessed application by the terminal pointed by the to-be-processed IP address, and an entropy of the frequency ratio of access to the target application by the terminal pointed by the to-be-processed IP address.

In some embodiments, the determination unit comprises: an establishment module configured to divide the to-be-processed IP addresses in the to-be-processed IP address set into two classes by using a clustering algorithm, wherein in different classes, mean vectors of the access information are different; a determination target module configured to determine a class having a larger mean vector in the two classes as a target class, and determine an IP address in the target class as a target IP address; and a determination probability module configured to determine a distance differential between the access information of the target IP address and the clustering centers of the two classes, the distance differential serving as a probability of access through the gateway by the terminal pointed by the target IP address.

In some embodiments, the setting unit is further configured to: grant the access privilege to the application to the selected target IP address.

According to the method and the apparatus for setting an access privilege provided by the present application, IP addresses having a frequency of access to a target application greater than or equal to a frequency threshold are acquired, IP addresses accessing a plurality of applications per time unit are selected from the IP addresses as to-be-processed IP addresses to generate a to-be-processed IP address set, then, for each to-be-processed IP address in the to-be-processed IP address set, access information, related to an access of a target application, of the to-be-processed IP address is acquired, then a plurality of target IP addresses in the to-be-processed IP address set are acquired based on the access information, and a probability of access through a gateway by the terminal pointed by each target IP address is determined, and finally, a preset proportion or a preset number of target IP addresses are selected from the plurality of target IP addresses in a descending order of the probability to set the access privilege. In the present application, the access information is used to determine a probability of access through the gateway by the target IP address, the higher the probability is, the more likely a user using the target IP address is a user performing regular access through the gateway. Setting a privilege based on the probability is capable of limiting the maliciously captured access to the application by the user, reducing flow stress on the server and simultaneously allowing regular access users to daily access the application.

BRIEF DESCRIPTION OF THE DRAWINGS

Through reading the detailed description of non-limiting embodiments made with reference to the following accompanying drawings, other features, objects and advantages of the present application will become more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
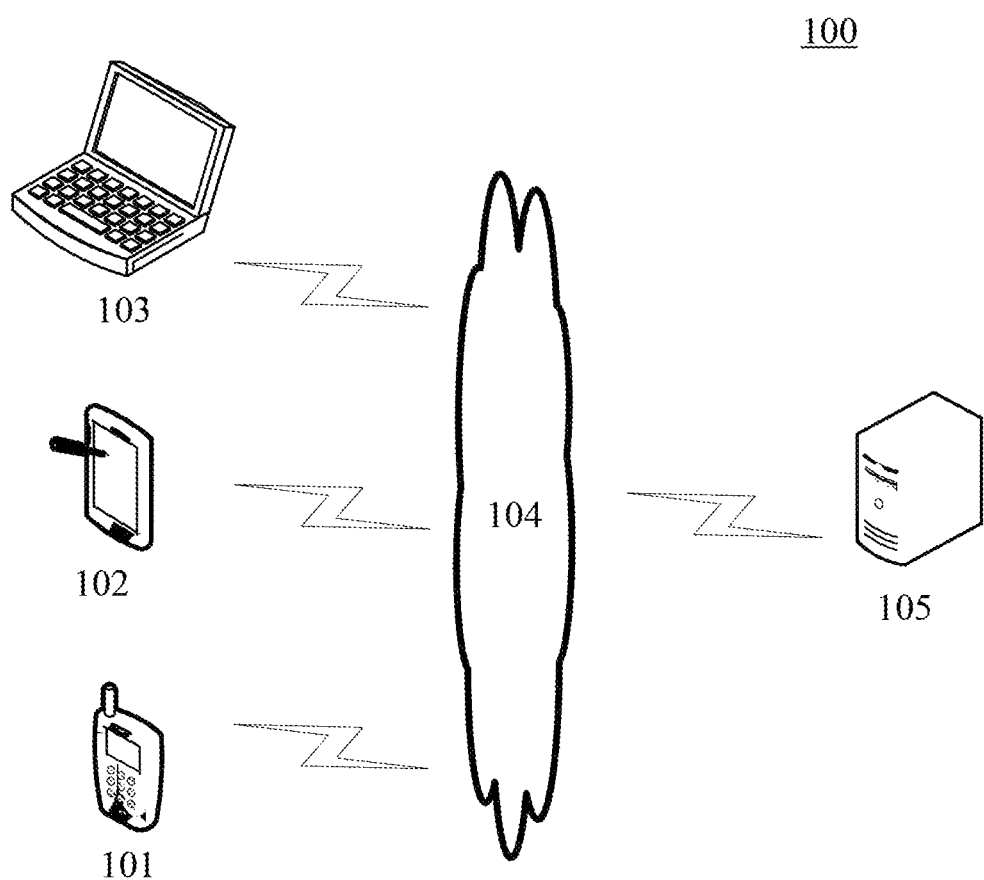
FIG. 1 is a diagram of an exemplary system architecture to which the present application may be applied.

FIG. 1 shows an exemplary architecture of a system 100 which may be used by a method and apparatus for setting an access privilege according to an embodiment of the present application.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the servers 105, 106 through the network 104, in order to transmit or receive messages, etc. Various communication client applications, such as web browser applications, shopping applications, search applications, instant messaging tools, mailbox clients, social platform software, may be installed on the terminal devices 101, 102 and 103.

The terminal devices 101, 102 and 103 may be various electronic devices capable of interacting with the server, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may be a server providing various services, for example, a backend application server providing support for applications displayed on the terminal devices 101, 102 or 103.

It should be noted that the method for setting an access privilege according to the embodiments of the present application is generally executed by the server 105, and accordingly, an apparatus for setting an access privilege is generally installed on the server 105.

It should be appreciated that the numbers of the terminal devices, the networks and the virtual machines in the virtual machine cluster in FIG. 1 are merely illustrative. Any number of terminal devices, networks and virtual machines may be provided based on the actual requirements.

Figure 2:
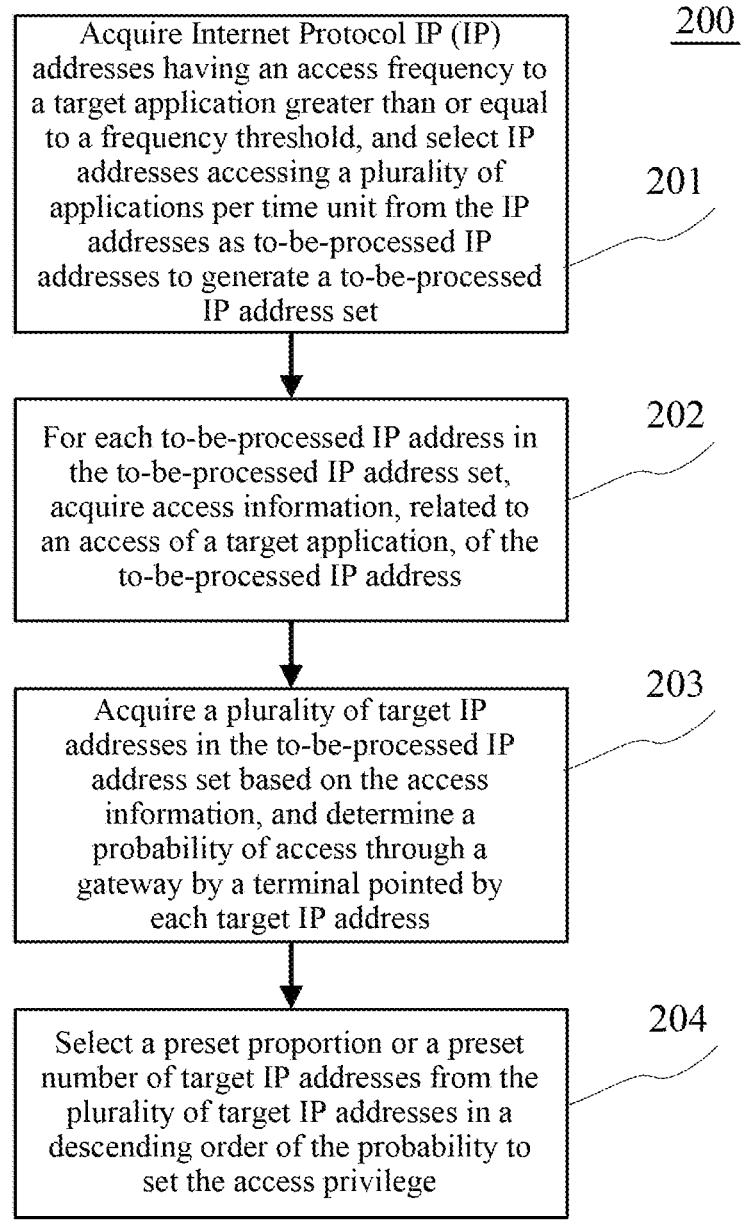
FIG. 2 is a flowchart of one embodiment of a method for setting an access privilege according to the present application.

Continuing to refer to FIG. 2, which illustrates a flowchart 200 of one embodiment of a method for setting an access privilege according to the present application. The method for setting the access privilege comprises the following steps:

Step 201, acquiring Internet Protocol IP (IP) addresses having a frequency of access to a target application greater than or equal to a frequency threshold, and selecting IP addresses accessing a plurality of applications per time unit from the IP addresses as to-be-processed IP addresses to generate a to-be-processed IP address set.

In this embodiment, an electronic device (such as a server shown in FIG. 1) running the method for setting the access privilege acquires IP addresses accessing a target application from access logs of the electronic device or other electronic devices, and screens IP addresses having a frequency of access greater than or equal to a frequency threshold among the IP addresses. The IP addresses accessing a plurality of applications per time unit are selected from the screened IP addresses. The selected IP addresses serve as to-be-processed IP addresses. Accordingly, a to-be-processed IP address set including a plurality of to-be-processed IP addresses is generated.

In this embodiment, the frequency refers to the number of accesses to an application per time unit, the frequency threshold is preset on the electronic device. Here, the applications in the target applications and the applications in the plurality of applications may all be applications in the application set preset on the electronic device. The target application accessed by a terminal may be one or more applications in the application set.

After the terminal accesses the application using the IP address, the electronic device records in the access log which application or applications are accessed by the terminal, and whether the frequency of access to the application by the terminal is greater than or equal to the frequency threshold. The electronic device may acquire IP addresses having a frequency of access to the application greater than or equal to the frequency threshold. From the acquired IP addresses, IP addresses accessing more than one application per time unit are selected as to-be-processed IP addresses. The to-be-processed IP addresses are grouped into a to-be-processed IP address set. Here, the time unit may be an arbitrary unit length of time such as one day, one hour or one minute.

Step 202, for each to-be-processed IP address in the to-be-processed IP address set, acquiring access information of the to-be-processed IP address related to an access to a target application.

In this embodiment, the electronic device acquires access information of each to-be-processed IP address in the to-be-processed IP address set from the access log, the access information is information related to the access of the application.

In some optional implementations of this embodiment, the access information may comprise vectors of at least one of the following components: the specified access time period when the terminal pointed by the to-be-processed IP address accesses each of the plurality of applications, the number of accesses corresponding to the specified time period, the number of applications accessed by the terminal pointed by the to-be-processed IP address per time unit, frequency of access to the most frequent accessed application by the terminal pointed by the to-be-processed IP address, and an entropy of the frequency ratio of access to the target application by the terminal pointed by the to-be-processed IP address. Here, the terminal pointed by the to-be-processed IP address generally refers to all terminals using the to-be-processed IP address. The frequency ratio may be the ratio of a frequency of access to one application by the to-be-processed IP address to a sum of frequencies of accesses to a plurality of preset applications by the to-be-processed IP address. If the frequency ratio is set as $p_i$, here, a calculation formula for the entropy may be $$\sum_{i=1}^{n}(-p_i \log p_i),$$

wherein the a value of $p_i$ is ($0 \le p_i \le 1$), the value of i is ($1 \le i \le n$), and n is the number of applications, which is an integral not less than 1.

The access information has a close relationship with the situation whether a user uses a gateway to access. For example, the larger the number of applications accessed per time unit by the user using the to-be-processed IP address is, the less likely the user performs malicious capture in relation to a given application. The lower the frequency ratio of access to the mostly frequent accessed application by the terminal is, the more evenly distributed the accesses to different applications by the user using this terminal are, and the more likely the user accesses through the gateway. For the entropy of the frequency ratio of access to the application by the terminal pointed by the to-be-processed IP address, the higher the entropy is, the more evenly distributed the accesses to the different applications by the user are.

The access information may be a value per time unit, and may also be an average value in a plurality of time units. For example, the access information may be a number of applications accessed by the terminal pointed by the to-be-processed IP address in one hour, and may also be an average value of the number of applications accessed by the terminal pointed by the to-be-processed IP address per hour in one day. The one or more numerical values may be acquired as the access information.

Step 203, based on the access information, acquiring a plurality of target IP addresses in the to-be-processed IP address set, and determining a probability of access through a gateway by a terminal pointed by each target IP address.

In this embodiment, based on the access information, a certain number of to-be-processed IP addresses in the to-be-processed IP address set are specified as a plurality of target IP addresses. A probability of access through the gateway by the terminal performing access using various target IP addresses is determined using the access information.

The electronic device may preset a rule of acquiring target IP addresses based on the access information. For example, an access information threshold may be set, access information exceeding the access information threshold are selected, to-be-processed IP addresses corresponding to the selected access information serve as target IP addresses. An average value of access information may also be calculated, to-be-processed IP addresses corresponding to the access information exceeding the average value serve as the target IP addresses. The to-be-processed IP addresses corresponding to the access information may also be classified by utilizing various clustering algorithms and calculation models to obtain two classes or multiple classes of to-be-processed IP addresses, and the to-be-processed IP addresses in at least one of the classes are selected as the target IP addresses.

In general, accessing applications through a gateway or proxy corresponds to the access habit of a user. Thus, if a terminal of a user accesses applications through the gateway, the user is generally a user performing regular access. A possibility of accessing through the gateway by the terminal pointed by the target IP address may be determined by utilizing the access information. Here, the possibility of accessing through the gateway by the terminal pointed by the target IP address may be represented by, for example, a probability. Each target IP address has a corresponding probability. Probabilities of various terminals pointed by a given target IP address are the same.

The probability may be acquired by using an unsupervised learning model. For example, a clustering algorithm may be used, such as K-means algorithm or Caussian mixture model (GMM) algorithm, and two algorithms may also be jointly used. The access information is input into the learning model, and then the probability is output after calculation using the model.

Step 204, selecting a preset proportion or a preset number of target IP addresses from the plurality of target IP addresses in a descending order of the probability to set the access privilege.

In this embodiment, the plurality of target IP addresses are sorted in the descending order of the probability to acquire a sorting list. Then, starting from a target IP address having the highest probability, a preset proportion or a preset number of target IP addresses are selected in the sorting list, then the access privilege is set to the selected target IP addresses. Here, the preset proportion refers to a ratio of the number of the selected target IP address to the number of all the target IP addresses in the plurality of target IP addresses.

Setting an access privilege may grant the access privilege to the application to the selected target IP address, or limit the access privilege to the application to the selected target IP address. As an example of granting the access privilege, a terminal of a user has the functionality of accessing applications, if IP used by the terminal of the user is a target IP address selected by the electronic device, the electronic device may grant the access privilege to an application A to the terminal of the user. In this way, the user may access the application A through the terminal.

In some application scenarios of this embodiment, an application server acquires IP addresses having a frequency of access to a target application greater than or equal to a frequency threshold, and selects IP addresses accessing a plurality of applications from the IP addresses as to-be-processed IP addresses to generate a to-be-processed IP address set. The application server may then acquire access information related to the access to a target application of the to-be-processed IP address from a log of the application. A plurality of target IP addresses in the to-be-processed IP address set may then be acquired based on the access information, and a probability of access through a gateway by a terminal pointed by various target IP addresses is determined. A preset proportion or a preset number of target IP addresses may finally be selected from the plurality of target IP addresses in a descending order of the probability to set the access privilege.

The method provided by the above embodiment of the present application utilizes the access information to determine the probability of access through the gateway by the target IP address and determine whether the user using the target IP address is a user performing regular access through the gateway, the higher the probability is, the more likely the user using this target IP address is the user performing regular access through the gateway. The privilege is set to the target IP address based on the probability, which is capable of limiting the maliciously captured access to the application by the user, reducing flow stress on the server and simultaneously allowing the regular access user to daily access the application.

Figure 3:
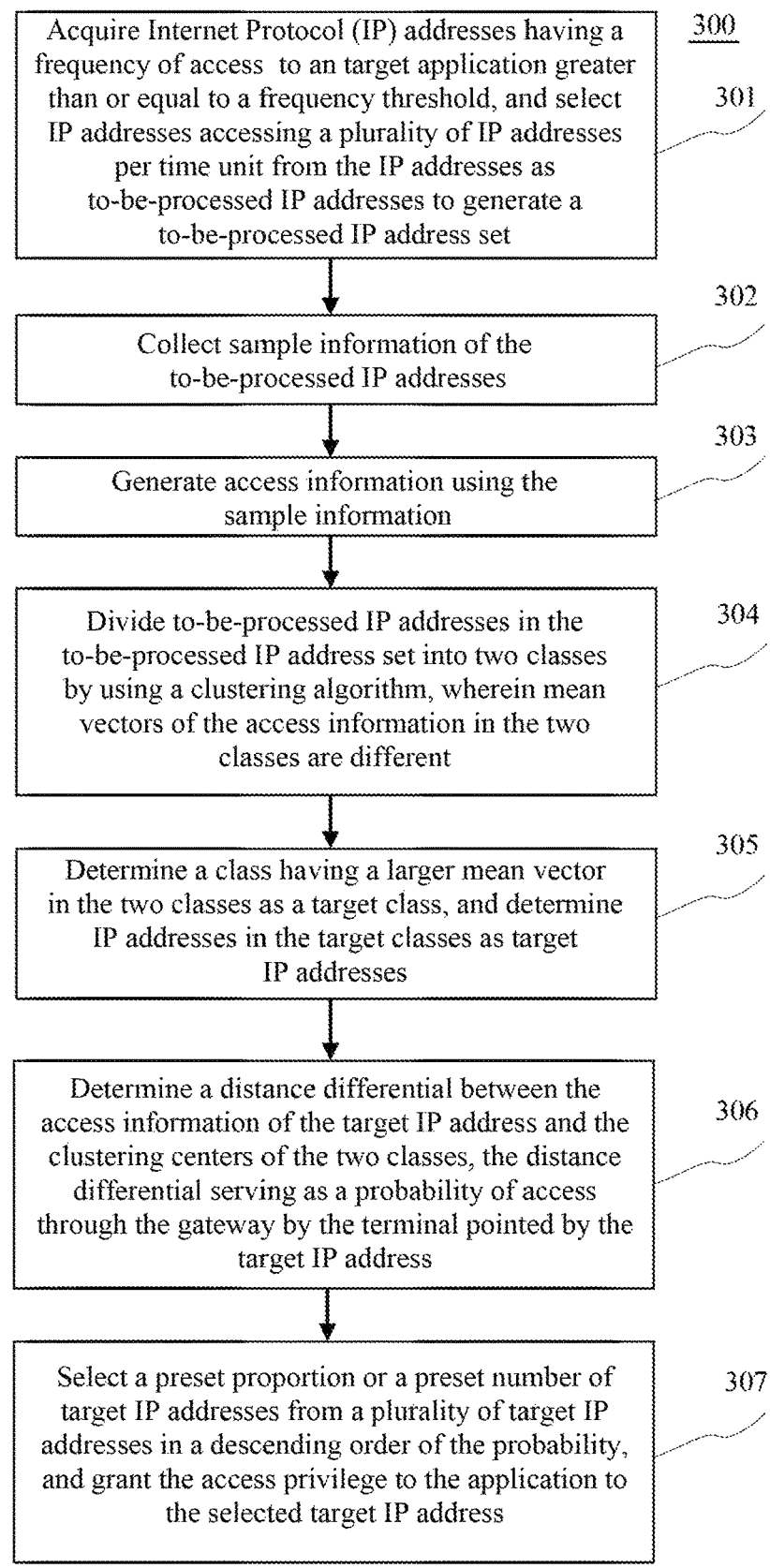
FIG. 3 is a flowchart of another embodiment of a method for setting an access privilege according to the present application.

Further referring to FIG. 3, which illustrates a flowchart 300 of another embodiment of a method for setting the access privilege. The flowchart 300 of the method for setting the access privilege comprises the following steps:

Step 301, acquiring Internet Protocol (IP) addresses having a frequency of access to an target application greater than or equal to a frequency threshold, selecting IP addresses accessing a plurality of IP addresses per time unit from the IP addresses as to-be-processed IP addresses to generate a to-be-processed IP address set.

In this embodiment, the electronic device acquires IP addresses accessing target applications from access logs of its own or other electronic devices, and screens IP addresses having a frequency of access greater than or equal to a frequency threshold from the IP addresses. Later, IP addresses accessing a plurality of applications per time unit are selected from the screened IP addresses, the selected IP addresses serve as to-be-processed IP addresses. A to-be-processed IP address set including a plurality of to-be-processed IP addresses is generated.

Step 302, collecting sample information of the to-be-processed IP addresses, the sample information comprising a specified time period when a terminal pointed by a to-be-processed IP address accesses various applications, and a number of accesses corresponding to the specified time period.

In this embodiment, the electronic device may collect sample information, related to the access to an application of the to-be-processed IP address, the sample information may comprise the specified time period when the terminal using the to-be-processed IP address accesses various applications, and the number of accesses to the application by the terminal in this time period.

The specified access time period refers to a specified historical time period when the terminal pointed by the to-be-processed IP address accesses each of the plurality of applications in this time period. The electronic device may specify any one historical time period to perform collection. For example, a time period from 12:00 a.m. to 1:00 a.m. on Nov. 1, 2016 may be specified. Within this time period, the number of accesses to the application by the terminal is the access number.

In this embodiment, the sample information may be not only the specified access time period and the number of its corresponding accesses but also other information such as the number of applications accessed by the terminal using the to-be-processed address per time unit.

Step 303, generating access information using the sample information.

In this embodiment, the sample information may be directly determined as the access information, or the access information is obtained through calculation using the sample information.

If the access information is a frequency ratio or an entropy of the frequency ratio, it may be determined by utilizing the specified access time period and the number of its corresponding accesses. For example, if a to-be-processed IP address accesses applications A, B and C with average access frequencies to these three applications being 600, 300 and 100 per hour over a day respectively, the frequency ratio to application A is 60%.

Step 304, dividing to-be-processed IP addresses in the to-be-processed IP address set into two classes by using a clustering algorithm, wherein mean vectors of the access information in the two classes are different.

In this embodiment, an Euclidean space is established, numerical values of vectors of the access information of various to-be-processed IP addresses are used as coordinate numerical values of coordinate points, clustering is performed in the Euclidean space by using a K-means clustering algorithm to divide the to-be-processed IP addresses into two classes. The mean vectors of the coordinate numerical values of the access information in the two classes are different.

Various components of the mean vectors may be an arithmetic mean of various components in various vectors for representing the access information in this class.

The coordinate points formed by the access information may be in an arbitrary dimension. For example, if 9 classes of access information are selected as the coordinate points, and 9 numerical values are respectively 100, 0.3, 3, 50, 0.5, 4, 60, 0.8 and 2, the coordinate points may be represented as a 9-dimensional coordinate point (100, 0.3, 3, 50, 0.5, 4, 60, 0.8, 2).

Step 305, determining a class having a larger mean vector in the two classes as a target class, and determining IP addresses in the target classes as target IP addresses.

In this embodiment, the mean vectors of the two classes are compared, a class having a larger mean vector serves as a target class, and to-be-processes IP addresses in the target class are preset as the target IP addresses, so the to-be-processes IP addresses in the target class serve as the target IP addresses, and this target class comprises a plurality of target IP addresses.

Vectors may be calculated by $$\sum_i a_i^2,$$

and then the mean vectors of the two classes are compared, wherein $a_i$ is the components of the vector.

In some optional implementations, for example, a terminal pointed by target IP addresses in a target class having a larger mean vector is identified as a terminal having a higher probability of access through the gateway. In these optional implementations, having a larger mean vector may reflect a higher "cross-access degree" of the target IP address in one aspect, that is to say, the target IP address accesses various applications relatively on average.

Alternatively, in other optional implementations, some known data may also be used to determine target classes. Particularly, known access information of IP of the terminal performing access through the gateway may be used as standard reference data. If in the Euclidean space, these access information coordinate points fall in a region of which class, this class serves as a target class.

Step 306, determining a distance differential between the access information of the target IP address and the clustering centers of the two classes, the distance differential serving as a probability of access through the gateway by the terminal pointed by the target IP address.

In this embodiment, a differential between a distance from the coordinate position of the access information of each target IP address in the target class to a clustering center of a non-target class and a distance from the coordinate position of the access information of each target IP address in the target class to the clustering center of the target class is calculated. The distance differential is the probability of access through the gateway by the terminal pointed by the target IP address.

Here, the distance differential may be calculated with respect to multi-dimensional numerical values using an Euclidean distance calculation formula. Particularly, in the two clustered classes, if a coordinate numerical value of the access information of a given target IP address is set as $p_i$, the target class is set as $p_g$, and the non-target class is set as $p_c$, the distance differential is $\|p_i-p_c\|-\|p_i-p_g\|$.

The larger the calculated distance differential is, the longer the distance from the target IP address to the non-target class is, and the closer the distance from the target IP address to the non-target class is, the higher the probability of access through the gateway by the terminal corresponding to the target IP address is.

Step 307, selecting a preset proportion or a preset number of target IP addresses from a plurality of target IP addresses in a descending order of the probability, and granting the access privilege to the application to the selected target IP address.

In this embodiment, a plurality of target IP addresses are sorted in the descending order of the probability to obtain a sorting list. Then, starting from a target IP address having the highest probability, a preset proportion or a preset number of target IP addresses are selected in the sorting list, and the selected target IP addresses are allowed to access specified applications.

If the electronic device needs to perform access flow limitation on the specified applications, a white list generation may be utilized to determine IP addresses having the access privilege to the specified applications.

Figure 4:
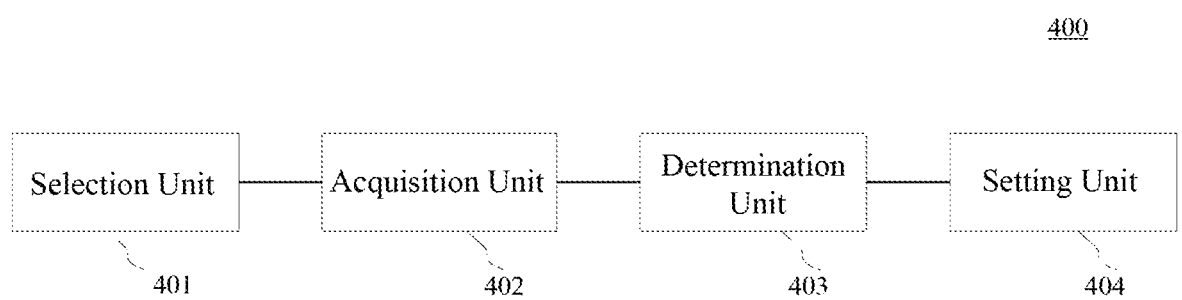
FIG. 4 is a schematic structural diagram of one embodiment of an apparatus for setting an access privilege according to the present application.

Further referring to FIG. 4, as implementation of the method shown in the above drawings, the present application provides an embodiment of an apparatus for setting the access privilege, the embodiment of the apparatus corresponds to the embodiment of the method shown in FIG. 2, and the apparatus particularly may be applied to various electronic devices.

As shown in FIG. 4, the apparatus 400 for setting the access privilege of this embodiment comprises a selection unit 401, an acquisition unit 402, a determination unit 403 and a setting unit 404, wherein, the selection unit 401 is configured to acquire Internet Protocol IP (IP) addresses having a frequency of access to a target application greater than or equal to a frequency threshold, and select IP addresses accessing a plurality of applications per time unit as to-be-processed IP addresses to generate a to-be-processed IP address set; the acquisition unit 402 is configured to, for each to-be-processed IP address in the to-be-processed IP address set, acquire access information, related to an access of a target application, of the to-be-processed IP address; the determination unit 403 is configured to acquire a plurality of target IP addresses in the to-be-processed IP address set based on the access information, and determine a probability of access through a gateway by a terminal pointed by each target IP address; and the setting unit 404 is configured to select a preset proportion or a preset number of target IP addresses from the plurality of target IP addresses in a descending order of the probability to set the access privilege.

In this embodiment, the selection unit 401 of the apparatus 400 for setting the access privilege acquires IP addresses accessing target applications from access logs of the electronic device or other electronic devices, and screens IP addresses having a frequency of access greater than or equal to a frequency threshold from the IP addresses. Later, IP addresses accessing a plurality of applications per time unit are selected from the screened IP addresses, the selected IP addresses serve as to-be-processed IP addresses, and thus, a to-be-processed IP address set including a plurality of to-be-processed IP addresses is generated.

In this embodiment, the acquisition unit 402 acquires access information of each to-be-processed IP address in the to-be-processed IP address set from the access logs, here, the access information is information related to an access of an application.

In this embodiment, the determination unit 403 may specify a certain number of to-be-processed IP addresses in the to-be-processed IP address set as a plurality of target IP addresses based on the access information, and then a probability of access through a gateway by a terminal using various target IP addresses is determined by utilizing the access information.

In this embodiment, the setting unit 404 sorts a plurality of target IP addresses in a descending order of the probability to obtain a sorting list. Then, starting from the target IP address having the highest probability, a preset proportion or a preset number of target IP addresses are selected in the sorting list, then, the access privilege is set to the selected target IP addresses. Here, the preset proportion refers to a ratio of the number of the selected target IP addresses to the number of all the target IP addresses in the plurality of target IP addresses.

In some optional implementations of this embodiment, the acquisition unit 402 comprises a collection module (not shown) configured to collect sample information of the to-be-processed IP address, the sample information comprising a specified access time period when the terminal pointed by the to-be-processed IP address accesses various applications, and a number of accesses corresponding to the specified time period; and a generation module (not shown) configured to generate access information using the sample information.

In some optional implementations of this embodiment, the access information is a vector comprising at least one of the following components: the specified access time period when the terminal pointed by the to-be-processed IP address accesses each of the plurality of applications, the number of accesses corresponding to the specified time period, the number of applications accessed by the terminal pointed by the to-be-processed IP address per time unit, an access frequency ratio of accesses to a most frequently accessed application by the terminal pointed by the to-be-processed IP address, and an entropy of the access frequency ratio of accesses to the target application by the terminal pointed by the to-be-processed IP address.

In some optional implementations of this embodiment, the determination unit 403 comprises: an establishment module (not shown) configured to divide the to-be-processed IP addresses in the to-be-processed IP address set into two classes by using a clustering algorithm, wherein in different classes, mean vectors of the access information are different; a determination target module (not shown) configured to determine a class having a larger mean vector in the two classes as a target class, and determine an IP address in the target class as a target IP address; and a determination probability module (not shown) configured to determine a distance differential between the access information of the target IP address and clustering centers of two classes, the distance differential serving as a probability of access through the gateway by the terminal pointed by the target IP address.

In some optional implementations of this embodiment, the setting unit 404 is further configured to: grant the access privilege to the application to the selected target IP address.

Figure 5:
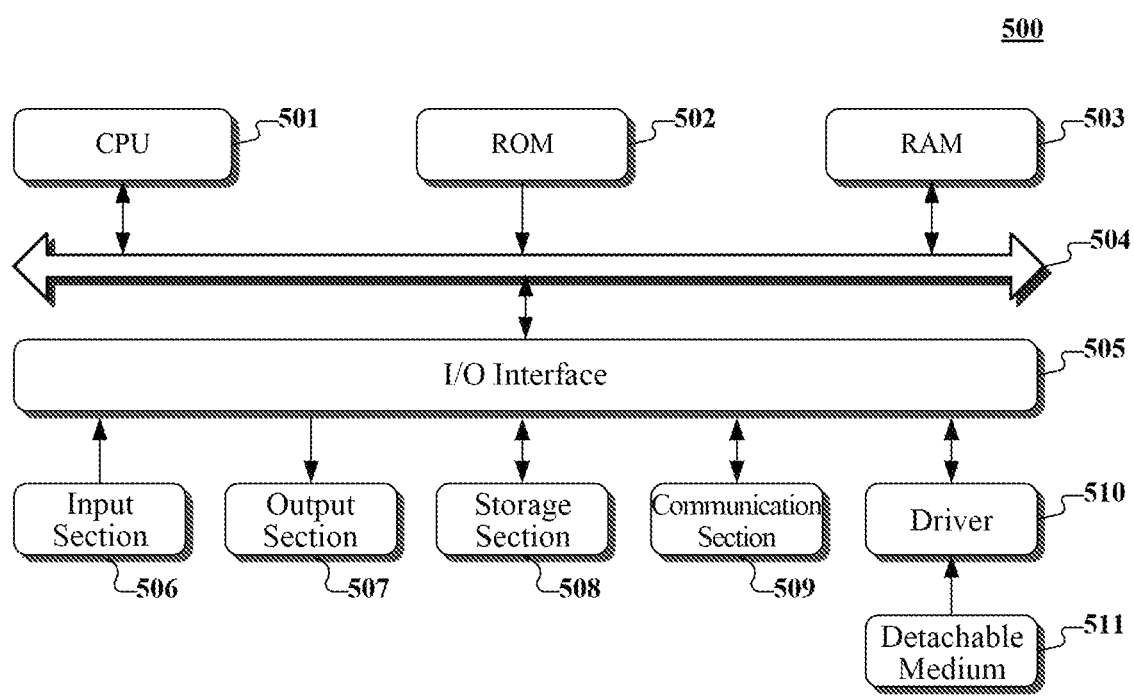
FIG. 5 is a schematic structural diagram of a computer system of a server suitable for implementing embodiments of the present application.

Referring to FIG. 5, which illustrates a schematic structure diagram of a computer system 500 of a server suitable for implementing embodiments of the present application. The server shown in FIG. 5 is only an example, and should not bring any limitation as to the scope of use and functionality of embodiments of the present application.

Referring to FIG. 5, a schematic structural diagram of a computer system 500 adapted to implement a server of the embodiments of the present application is shown. As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of the present application. It needs to be noted that the computer readable medium in the present disclosure may be computer readable signal medium or computer readable storage medium or a combination thereof. An example of the computer readable storage medium may include but not limited to: systems, apparatus or elements of electric, magnet, optical, electromagnet, infrared ray, or semiconductor or a combination thereof. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or a combination thereof. In the present disclosure, the computer readable storage medium may be any physical medium containing or storing programs which can be used by a command execution system, apparatus or element or the incorporation thereof. In the present disclosure, the computer readable signal medium may include data signal in the base band or propagating as parts of a carrier in which computer readable program codes are carried. The propagated signal may take various forms, include but is not limited to: an electromagnetic signal, an optical signal or a combination thereof. The signal medium that can be read by computer may be any computer readable medium except for the computer readable storage medium. The computer readable medium is capable of transmitting, propagating or transferring programs for used by or used in combination with a command execution system, apparatus or element. The program codes contained on the computer readable medium may be transmitted with any suitable medium including but is not limited to: a wireless medium, a wired medium, an optical cable medium, a RF medium and the like, or any combination thereof.

The flowcharts and block diagrams in the figures illustrate architectures, functions and operations that may be implemented according to the system, the method and the computer program product of the various embodiments of the present invention. In this regard, each block in the flowcharts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising a selection unit, an acquisition unit, a receiving unit, a determination unit and a setting unit, where the names of these units or modules are not considered as a limitation to the units or modules. For example, the selection unit may also be described as "a unit for acquiring Internet Protocol IP (IP) addresses having a access frequency to a target application greater than or equal to a frequency threshold, and selecting IP addresses accessing a plurality of applications per time unit as to-be-processed IP addresses to generate a to-be-processed IP address set."

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: acquire Internet Protocol IP (IP) addresses having a frequency of access to a target application greater than or equal to a frequency threshold, and select IP addresses accessing a plurality of applications per time unit from the IP addresses as to-be-processed IP addresses to generate a to-be-processed IP address set; for each to-be-processed IP address in the to-be-processed IP address set, acquire access information of the to-be-processed IP address related to an access to the target application; acquire a plurality of target IP addresses in the to-be-processed IP address set based on the access information, and determine a probability of access through a gateway by a terminal pointed by each target IP address; and select a preset proportion or a preset number of target IP addresses from the plurality of target IP addresses in a descending order of the probability to set the access privilege.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for setting an access privilege, comprising:
  acquiring Internet Protocol IP (IP) addresses having a frequency of access to a target application greater than or equal to a frequency threshold, and selecting IP addresses accessing more than one application per time unit from the acquired IP addresses as to-be-processed IP addresses to generate a to-be-processed IP address set;
  for each to-be-processed IP address in the to-be-processed IP address set, acquiring access information of the to-be-processed IP address related to an access to the target application;
  acquiring a plurality of target IP addresses in the to-be-processed IP address set based on the access information, and determining a probability of access through a gateway by a terminal pointed by each target IP address; and
  selecting a preset proportion or a preset number of target IP addresses from the plurality of target IP addresses in a descending order of the probability to set the access privilege;
  wherein for each to-be-processed IP address in the to-be-processed IP address set, acquiring access information of the to-be-processed IP address related to an access to the target application comprises:
  collecting sample information of the to-be-processed IP address, the sample information comprising a specified access time period when the terminal pointed by the to-be-processed IP address accesses each of the plurality of applications, and a number of accesses corresponding to the specified time period; and
  generating the access information using the sample information; and
  wherein the selecting a preset proportion or a preset number of target IP addresses from the plurality of target IP addresses in a descending order of the probability to set the access privilege comprises: granting the access privilege to a preset application to the selected target IP address.

2. The method for setting an access privilege according to claim 1, wherein the access information is a vector comprising at least one of the following components:

the specified access time period when the terminal pointed by the to-be-processed IP address accesses each of the plurality of applications, the number of access times corresponding to the specified time period, a number of applications accessed by the terminal pointed by the to-be-processed IP address per time unit, a frequency ratio of access to a most frequently accessed application by the terminal pointed by the to-be-processed IP address, and an entropy of the frequency ratio of access to the target application by the terminal pointed by the to-be-processed IP address.

3. The method for setting an access privilege according to claim 2, wherein the acquiring a plurality of target IP addresses in the to-be-processed IP address set based on the access information, and determining a probability of access through a gateway by a terminal pointed by each target IP address comprises:

dividing the to-be-processed IP addresses in the to-be-processed IP address set into two classes by using a clustering algorithm, wherein mean vectors of the access information in the two classes are different;

determining a class having a larger mean vector in the two classes as a target class, and determining an IP address in the target class as a target IP address; and determining a distance differential between the access information of the target IP address and clustering centers of the two classes, the distance differential serving as the probability of access through the gateway by the terminal pointed by the target IP address.

4. An apparatus for setting an access privilege, comprising:

at least one processor; and a memory storing instructions, which when executed by the at least one processor, cause the at least one processor to perform operations, the operations comprising:

acquiring Internet Protocol IP (IP) addresses having a frequency of access to a target application greater than or equal to a frequency threshold, and selecting IP addresses accessing more than one application per time unit from the acquired IP addresses as to-be-processed IP addresses to generate a to-be-processed IP address set;

for each to-be-processed IP address in the to-be-processed IP address set, acquiring access information, related to an access of the target application, of the to-be-processed IP address;

acquiring a plurality of target IP addresses in the to-be-processed IP address set based on the access information, and determining a probability of access through a gateway by a terminal pointed by each target IP address; and selecting a preset proportion or a preset number of target IP addresses from the plurality of target IP addresses in a descending order of the probability to set the access privilege;

wherein the for each to-be-processed IP address in the to-be-processed IP address set, acquiring access information, related to an access of a target application, of the to-be-processed IP address comprises:

collecting sample information of the to-be-processed IP address, the sample information comprising a specified access time period when the terminal pointed by the to-be-processed IP address accesses each of the plurality of applications, and a number of accesses corresponding to the specified time period; and generating access information using the sample information; and wherein the selecting a preset proportion or a preset number of target IP addresses from the plurality of target IP addresses in a descending order of the probability to set the access privilege comprises: granting the access privilege to a preset application to the selected target IP address.

5. The apparatus for setting an access privilege according to claim 4, wherein the access information is a vector comprising at least one of the following components:

the specified access time period when the terminal pointed by the to-be-processed IP address accesses each of the plurality of applications, the number of accesses corresponding to the specified time period, the number of applications accessed by the terminal pointed by the to-be-processed IP address per time unit, an frequency ratio of access to a most frequently accessed application by the terminal pointed by the to-be-processed IP address, and the entropy of the frequency ratio of access to the target application by the terminal pointed by the to-be-processed IP address.

6. The apparatus for setting an access privilege according to claim 5, wherein the acquiring a plurality of target IP addresses in the to-be-processed IP address set based on the access information, and determining a probability of access through a gateway by a terminal pointed by each target IP address comprises:

dividing the to-be-processed IP addresses in the to-be-processed IP address set into two classes by using a clustering algorithm, wherein mean vectors of the access information in the two classes are different;

determining a class having a larger mean vector in the two classes as a target class, and determining an IP address in the target class as a target IP address; and determining a distance differential between the access information of the target IP address and clustering centers of the two classes, the distance differential serving as a probability of access through the gateway by the terminal pointed by the target IP address.

7. A non-transitory computer-readable storage medium storing computer executable programs, which when executed by one or more processors, cause the one or more processors to perform operations, the operations comprising:

acquiring Internet Protocol IP (IP) addresses having a frequency of access to a target application greater than or equal to a frequency threshold, and selecting IP addresses accessing more than one application per time unit from the acquired IP addresses as to-be-processed IP addresses to generate a to-be-processed IP address set;

for each to-be-processed IP address in the to-be-processed IP address set, acquiring access information, related to an access of a target application, of the to-be-processed IP address;

acquiring a plurality of target IP addresses in the to-be-processed IP address set based on the access information, and determining a probability of access through a gateway by a terminal pointed by each target IP address; and selecting a preset proportion or a preset number of target IP addresses from the plurality of target IP addresses in a descending order of the probability to set the access privilege;

wherein for each to-be-processed IP address in the to-be-processed IP address set, acquiring access information of the to-be-processed IP address related to an access to the target application comprises:

collecting sample information of the to-be-processed IP address, the sample information comprising a specified access time period when the terminal pointed by the to-be-processed IP address accesses each of the plurality of applications, and a number of accesses corresponding to the specified time period; and generating the access information using the sample information; and wherein the selecting a preset proportion or a preset number of target IP addresses from the plurality of target IP addresses in a descending order of the probability to set the access privilege comprises: granting the access privilege to a preset application to the selected target IP address.

* * * * *